United States Patent
Uchiyama et al.

(10) Patent No.: US 9,170,167 B2
(45) Date of Patent: Oct. 27, 2015

(54) PRESSURE SENSOR

(71) Applicant: Seiko Instruments Inc., Chiba (JP)

(72) Inventors: Takeshi Uchiyama, Chiba (JP); Masataka Shinogi, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 255 days.

(21) Appl. No.: 13/779,852

(22) Filed: Feb. 28, 2013

(65) Prior Publication Data

US 2013/0247676 A1    Sep. 26, 2013

(30) Foreign Application Priority Data

Mar. 8, 2012   (JP) .................................. 2012-051472

(51) Int. Cl.
  *G01L 9/16*   (2006.01)
  *G01L 13/02*  (2006.01)
  *G01L 19/00*  (2006.01)
  *G01L 9/00*   (2006.01)

(52) U.S. Cl.
  CPC ............... *G01L 13/02* (2013.01); *G01L 9/0019* (2013.01); *G01L 9/0055* (2013.01); *G01L 19/0038* (2013.01)

(58) Field of Classification Search
  CPC ........................... G01L 19/0038; G01L 9/0055
  USPC .............................................. 73/721; 310/311
  See application file for complete search history.

(56) References Cited

U.S. PATENT DOCUMENTS

2009/0079298 A1*   3/2009   Park et al. ..................... 310/311

OTHER PUBLICATIONS

N. Minh-Dung, H. Takahashi, K. Matsumoto and I. Shimoyama, Solid-State Sensors, Actuators and Microsystems Conference (Transducers), 2011 16th International, On pp. 898-901.*

H. Takahashi, K. Matsumoto and I. Shimoyama, "Air pressure sensor for an insect wing", Proceedings of IEEE 22nd MEMS Conference, pp. 825-828, 2009.*

* cited by examiner

*Primary Examiner* — Lisa Caputo
*Assistant Examiner* — Nathaniel T Woodward
(74) *Attorney, Agent, or Firm* — Adams & Wilks

(57) ABSTRACT

A pressure sensor has a detecting unit configured to detect a difference between outputs from deformation detecting units of first and second pressure variation sensors. The first and second pressure variation sensors are connected to one another so that the gap of the first pressure variation sensor communicates the exterior of the cavities of the first and second pressure variation sensors and the interior of the cavity of the first pressure variation sensor, and so that the gap of the second pressure variation sensor communicates the interior of the cavity of the first pressure variation sensor and the interior of the cavity of the second pressure variation sensor.

20 Claims, 5 Drawing Sheets

Fig. 6A
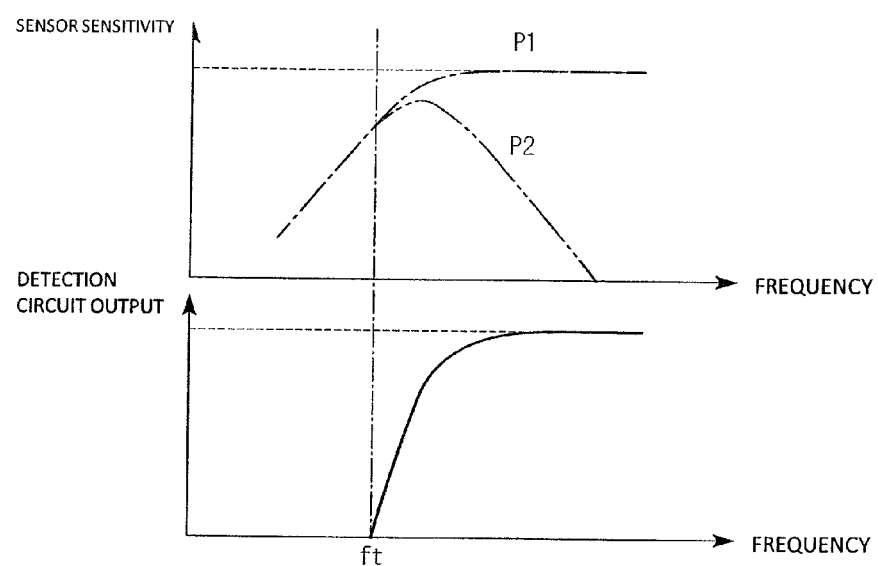
Fig. 6B
Fig. 7
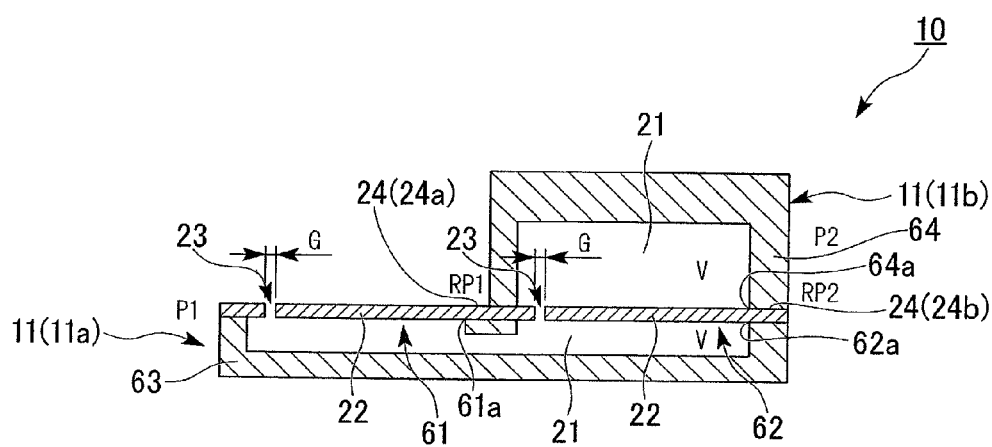

PRESSURE SENSOR

BACKGROUND OF THE INVENTION

1. Technical Field

The present invention relates to a pressure sensor.

2. Description of the Related Art

In the related art, for example, a differential pressure sensor (pressure sensor) including two pressure sensor elements of both-side pressure receiving type arranged in the proximity of two symmetrical positions on a pressure introducing route so as to have reverse polarities from each other, and configured to amplify differential of outputs from both of the pressure sensor elements, thereby obtaining an output from which a detection error due to temperature characteristics of the pressure sensor elements and vibrations caused by disturbance are compensated is known (for example, see JP-A-4-29027).

Incidentally, if the pressure sensor of the related art described above has, for example, a gentle or no frequency dependency of sensitivity with respect to the pressure in accordance with the shape and material of the sensing portion, and has a sensitivity substantially equivalent to a wide range of frequency band, a noise (sound) caused by signals in other frequency bands may increase with respect to signals in a desired frequency band, so that there is a risk of saturation of the output from the pressure sensor due to the signals other than the desired frequency band.

SUMMARY

In view of such circumstances, it is an object of the invention to provide a pressure sensor configured to be capable of obtaining desired frequency characteristics while reducing detection errors and vibrations due to disturbance.

In order to solve the problem described above and achieve the object described above, there is provided a pressure sensor including: two pressure variation sensors (for example, a first pressure variation sensor (P1) $11a$ and a second pressure variation sensor (P2) $11b$ of the embodiment), and a detecting unit configured to detect the difference between outputs from the two pressure variation sensors (for example, a detection circuit $12$ of the embodiment), and the pressure variation sensor includes: an opening cavity (for example, a cavity $21$ of the embodiment); a cantilever (for example, a cantilever $22$ of the embodiment) formed into a plate shape extending from a proximal side toward a distal side, including a proximal end portion (for example, a proximal end portion $22a$ of the embodiment) supported in a cantilevered state at an opening end (for example, an opening end $21a$ of the embodiment) of the cavity and a distal end portion (for example, a distal end portion $22b$ of the embodiment) as a free end and configured to be subject to a flexural deformation in accordance with the pressure difference between the interior and the exterior of the cavity; a gap (for example, a gap $23$ of the embodiment) provided between the distal end portion of the cantilever and the opening end of the cavity and configured to communicate the interior and the exterior of the cavity; and a deformation detecting unit (for example, a piezoresistance $24$ of the embodiment) configured to detect a flexural deformation of the cantilever and output a signal of a result of detection, the two pressure variation sensors have lower limit frequencies which provide sensitivities of the two pressure variation sensors equal to or higher than the predetermined value as the effectively same frequency characteristics in accordance at least with a capacity of the cavity and a distance of the gap, the gap of one of the pressure variation sensors communicates the exterior of the cavities of the two pressure variation sensors and the interior of the cavity of the one pressure variation sensor, and the gap of the other pressure variation sensor communicates the interior of the cavity of the one pressure variation sensor and the interior of the cavity of the other pressure variation sensor.

In addition, according to the pressure sensor of the invention, the cantilever of the one pressure variation sensor is arranged at one opening end (for example, an opening end $51a$ in the embodiment) of a cylindrical portion (for example, a cylindrical portion $51$ of the embodiment) which forms the cavity of the one pressure variation sensor in the direction of extension, and the cantilever of the other pressure variation sensor is arranged between the other opening end of the cylindrical portion in the direction of extension and an opening end (for example, an opening end $52a$ of the embodiment) of a bottomed cylindrical portion (for example, a bottomed cylindrical portion $52$ of the embodiment) forming the cavity of the other pressure variation sensor.

Furthermore, according to the pressure sensor of the invention, the cantilever of the one pressure variation sensor is arranged at the opening end (for example, an opening end $61a$ of the embodiment) of a first opening portion (for example, a first opening portion $61$ of the embodiment) of a first bottomed cylindrical portion (for example, a first bottomed cylindrical portion $63$ of the embodiment) forming the cavity of the one pressure variation sensor, and the cantilever of the other pressure variation sensor is arranged between an opening end (for example, an opening end $62a$ of the embodiment) of a second opening portion (for example, a second opening portion $62$ of the embodiment) of the first bottomed cylindrical portion and an opening end (for example, an opening end $64a$ of the embodiment) of a second bottomed cylindrical portion (for example, a second bottomed cylindrical portion $64$ of the embodiment) forming the cavity of the other pressure variation sensor.

In addition, according to the pressure sensor of the invention, the deformation detecting unit includes a piezoresistance (for example, a piezoresistance $24$ of the embodiment) formed by doping impurity at the proximal end portion of the cantilever formed of a semiconductor material.

According to the pressure sensor of the invention, the two pressure variation sensors having the effectively same frequency characteristics are arranged in series (two levels) on, so to speak, a pressure transmitting route, pressure variations generated on the exterior of the cavities of the two pressure variation sensors are transmitted, so to speak, directly to the cavity of the one pressure variation sensor and are transmitted, so to speak, indirectly, via the one pressure variation sensor to the cavity of the other pressure variation sensor.

In association with this, for example, the two pressure variation sensors have the same sensitivity with respect to vibrations in a low frequency band, while the sensitivity of the other pressure variation sensor is lower than the sensitivity of the one pressure variation sensor for the vibrations in a high frequency band.

Therefore, by detecting the difference between the outputs between the two pressure variation sensors, the pressure variations in the frequency band lower than a desired lower limit frequency may be compensated, and the pressure sensor may be caused to act so as to have sensitivity having cutoff characteristics steeper than that of the one pressure variation sensors.

Accordingly, increase in noise (sound) with respect to the pressure variations in the desired frequency bands due to the pressure variations in other frequency characteristics other than the desired frequency characteristics is prevented, and saturation of the signal in the amplifying circuit of the first step is prevented.

In addition, the detection error due to the temperature characteristic or vibrations due to the disturbance generated in the pressure variation sensors may be compensated by the difference in output from the two pressure variation sensors, so that the detection accuracy of the pressure variations may be improved.

BRIEF DESCRIPTION OF THE DRAWINGS

FIGS. 6A and 6B are graphs showing an example of an output from the pressure sensor according to the embodiment of the invention;

FIG. 7 is a configuration diagram of the pressure sensor according to a first modification of the invention;

DETAILED DESCRIPTION OF THE PREFERRED EMBODIMENTS

Figure 1A:
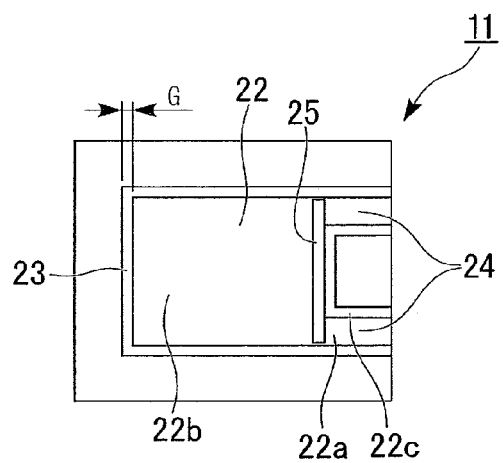
FIGS. 1A and 1B are a plan view and a cross-sectional view of a pressure variation sensor of a pressure sensor according to an embodiment of the invention.

Referring now to the drawings, a pressure sensor according to an embodiment of the invention will be described.

A pressure sensor 10 of the embodiment includes two pressure variation sensors 11 (for example, a first pressure variation sensor (P1) 11a and a second pressure variation sensor (P2) 11b) having the effectively same frequency characteristics and arranged in series (two levels) on a so-called pressure transmitting route, and a detection circuit 12 configured to detect the difference between outputs from the two pressure variation sensors 11. The pressure sensor 10 outputs a signal according to variations in pressure (for example, atmospheric pressure).

Figure 1B:
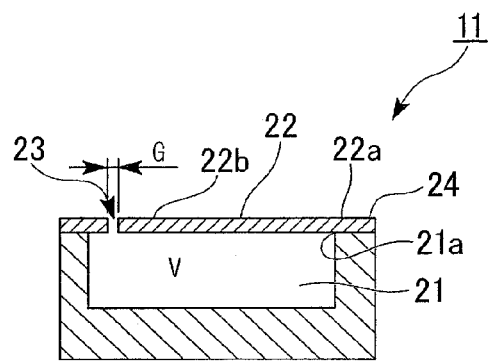

The pressure variation sensor 11 of the pressure sensor 10 is formed of an SOI substrate obtained by thermally sticking a silicon supporting layer, an oxidized layer formed of $SiO_2$, and a silicon active layer. For example, as illustrated in FIGS. 1A and 1B, the pressure variation sensor 11 of the pressure sensor 10 includes a cavity 21, a cantilever 22, a gap 23, and piezoresistances 24.

The cavity 21 is formed into a bottomed cylindrical shape with an opening using, for example, the silicon supporting layer of the SOI substrate.

The cantilever 22 is formed into a plate shape extending in the direction from a proximal end side toward a distal end side (longitudinal direction) using the silicon active layer of the SOI substrate, includes a proximal end portion 22a supported at an opening end 21a of the cavity 21 in a cantilevered manner and a distal end portion 22b having a free end, and is subject to a flexural deformation in accordance with the pressure difference between the interior and the exterior of the cavity 21.

The gap 23 is provided between the distal end portion 22b of the cantilever 22 and the opening end 21a of the cavity 21, and communicates the interior and the exterior of the cavity 21.

The piezoresistances 24 are formed by a doping agent (impurity) such as phosphorus doped on the proximal end portion 22a of the cantilever 22 by various methods such as an ion implantation method or a diffusion method, are provided so as to sandwich a through hole 22c penetrating the proximal end portion 22a of the cantilever 22 in the thickness direction from both sides in the short direction (the direction orthogonal to the longitudinal direction and the thickness direction of the cantilever 22), and vary the resistance value in accordance with the deformation amount of the flexural deformation of the cantilever 22 (that is, the magnitude of the stress).

The one and the other piezoresistances 24 provided on the both sides of the through hole 22c are connected to the detection circuit 12 described later, and a wiring portion 25 formed of a conductive material and provided at a position shifted toward the distal end side from the through hole 22c at the proximal end portion 22a of the cantilever 22, and a general shape including the wiring portion 25 and the one and the other piezoresistances 24 is formed into a U-shape in plan view.

Accordingly, for example, when a predetermined voltage is applied to one of the piezoresistances 24, a current caused by the voltage application flows around the through hole 22c and flows by way of one of the piezoresistances 24 through the wiring portion 25 to the other piezoresistance 24. This current corresponds to an output from the pressure variation sensor 11 varied in magnitude in accordance with the resistance value of the piezoresistance 24 varying in accordance with the amount of the flexural deformation of the cantilever 22.

The pressure variation sensor 11 has specific frequency characteristics in accordance at least with the capacity V of the cavity 21 or the distance G of the gap 23.

The frequency characteristics is a lower limit frequency having a sensitivity of the pressure variation sensor 11 equal to or higher than the predetermined value such as a cutoff frequency fc, for example, and the sensitivity has a decreasing tendency in association with the lowering of the frequency with respect to pressure variations in a frequency band lower than the lower limit frequency and the sensitivity is changed to have an increasing tendency from the predetermined value so as to be saturated to the upper limit value in association with the increase in frequency with respect to the pressure variations in the frequency band higher than the lower limit frequency.

An operation example of the pressure variation sensor 11 will be given below.

Figure 2A:
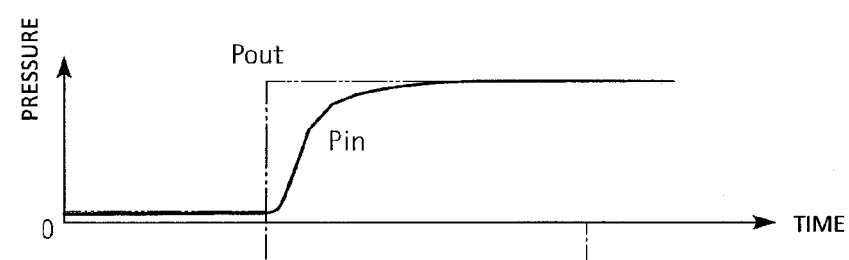
FIGS. 2A and 2B are graphs showing an example of an output from the pressure variation sensor of the pressure sensor according to the embodiment of the invention.
Figure 2B:
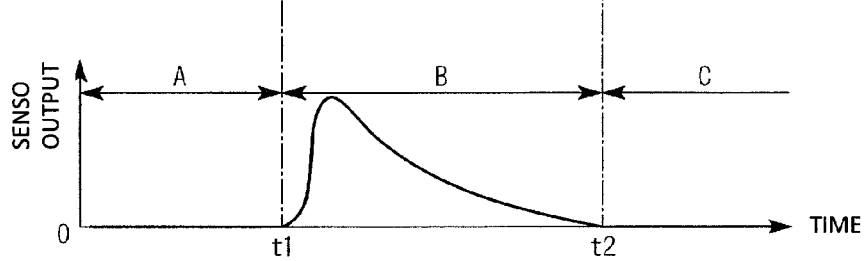
Figure 3A:
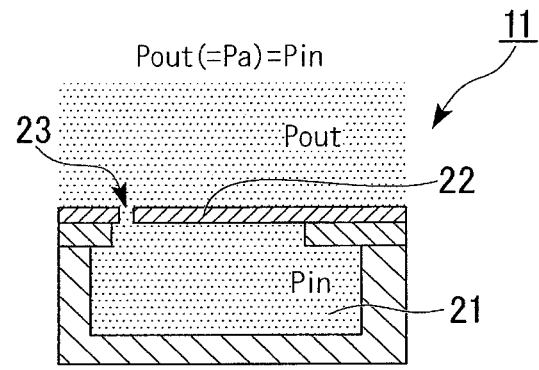
FIGS. 3A to 3C are drawings illustrating an example of an action of the pressure variation sensor of the pressure sensor according to the embodiment of the invention.

In the pressure variation sensor 11, for example, when the pressure difference between a pressure Pout (first predetermined pressure Pa) on the exterior of the cavity 21 and a pressure Pin on the interior of the cavity 21 is zero as in a period A shown in FIGS. 2A and 2B, the cantilever 22 is not subject to the flexural deformation and the output from the pressure variation sensor 11 (the sensor output) is zero, for example, as illustrated in FIG. 3A.

Figure 3B:
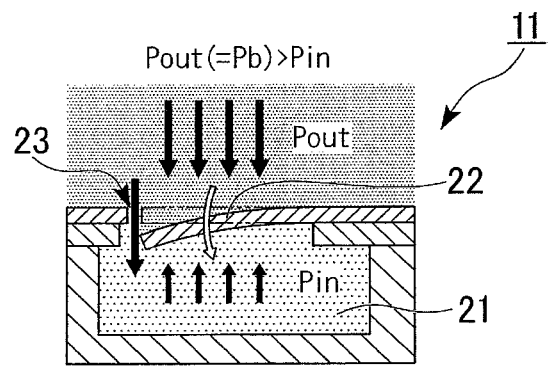

In contrast, for example, as a period B from the time-of-day t1 shown in FIGS. 2A and 2B, when the outer pressure Pout of the cavity 21 is increased step by step (Pout←second predetermined pressure Pb>Pa), the cantilever 22 starts the flexural deformation in accordance with the pressure difference between the exterior and the interior of the cavity 21, for example, as illustrated in FIG. 3B, and the output from the pressure variation sensor 11 is changed to the increasing tendency in association with the increase in this deformation amount.

Then, when a pressure transmission medium flows from the exterior to the interior of the cavity 21 via the gap 23 and the pressure Pin on the interior of the cavity 21 is increased gradually in a gentler response than the variations of the pressure Pout on the exterior thereof, the deformation amount of the cantilever 22 is changed to have a decreasing tendency in association with the decrease in the pressure difference between the exterior and the interior of the cavity 21, and hence the output from the pressure variation sensor 11 is changed to have a decreasing tendency.

Figure 3C:
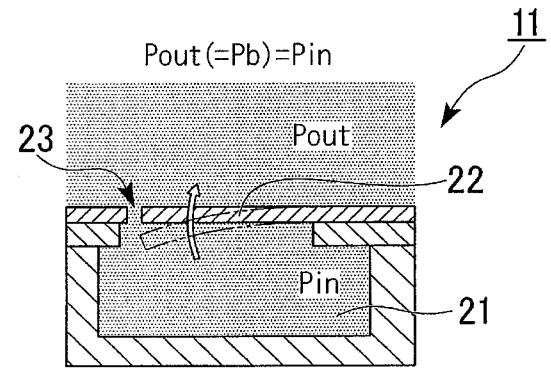

Then, for example, when the pressure Pin in the interior of the cavity 21 is equal to the pressure Pout on the exterior thereof as a period C from a time-of-day t2 onward as shown in FIGS. 2A and 2B (Pin=Pout=Pb), the flexural deformation of the cantilever 22 is released as illustrated in FIG. 3C, and the output from the pressure variation sensor 11 becomes zero.

Figure 4:
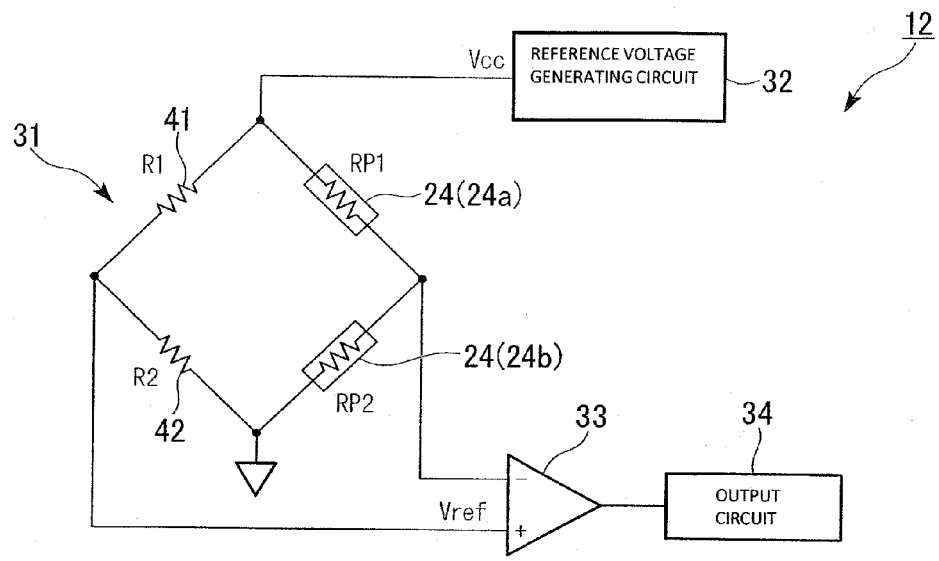
FIG. 4 is a configuration diagram of the pressure sensor according to the embodiment of the invention.

The detection circuit 12 of the pressure sensor 10 includes a bridge circuit 31, a reference voltage generating circuit 32, a differential amplifying circuit 33, and an output circuit 34 as illustrated in FIG. 4 for example.

The bridge circuit 31 includes a branch portion including the piezoresistance 24 of the first pressure variation sensor (P1) 11a (first piezoresistance 24a: resistance value RP1) and the piezoresistance 24 (second piezoresistance 24b: resistance value RP2) of the second pressure variation sensor (P2) 11b connected in series and a branch portion including a fixed resistance 41 (resistance value R1) and a fixed resistance 42 (resistance value R2) connected in series, and these branches are connected in parallel to the reference voltage generating circuit 32.

In the bridge circuit 31, a connecting point between the first piezoresistance 24a and the second piezoresistance 24b is connected to an inverting input terminal of the differential amplifying circuit 33, and a connecting point between the fixed resistances 41 and 42 is connected to a non-inverting input terminal of the differential amplifying circuit 33.

The reference voltage generating circuit 32 applies a predetermined reference voltage Vcc to the bridge circuit 31.

The differential amplifying circuit 33 detects a potential difference between a connecting point between the fixed resistances 41 and 42 of the bridge circuit 31 and a connecting point between the first piezoresistance 24a and the second piezoresistance 24b, and the potential difference is amplified in a predetermined gain before outputting therefrom.

The potential difference corresponds to the difference between the resistance value RP1 of the first piezoresistance 24a and the resistance value RP2 of the second piezoresistance 24b (RP1−RP2), that is, a value in accordance with the difference between the output from the first pressure variation sensor (P1) 11a and the output from the second pressure variation sensor (P2) 11b.

Figure 5:
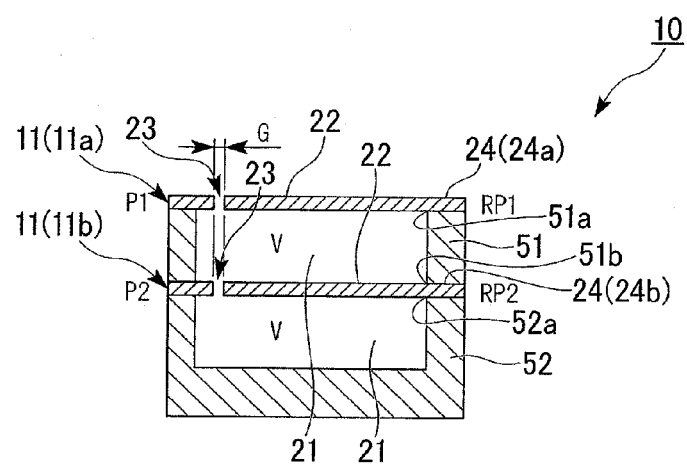
FIG. 5 is a configuration diagram of the pressure sensor according to the embodiment of the invention.

The first pressure variation sensor (P1) 11a and the second pressure variation sensor (P2) 11b are arranged in series (two levels) on the pressure transmitting route, for example, as illustrated in FIG. 5, and the interior of the cavity 21 of the first pressure variation sensor (P1) 11a communicates with the exterior via the gap 23 of the first pressure variation sensor (P1) 11a.

Then, the interior of the cavity 21 of the second pressure variation sensor (P2) 11b communicates with the exterior via the gap 23 of the second pressure variation sensor (P2) 11b, the interior of the cavity 21 of the first pressure variation sensor (P1) 11a, and the gap 23 of the first pressure variation sensor (P1) 11a in sequence.

In other words, the gap 23 of the second pressure variation sensor (P2) 11b communicates the interiors of the cavities 21 of the first pressure variation sensor (P1) 11a and the second pressure variation sensor (P2) 11b with each other.

The cavity 21 of the first pressure variation sensor (P1) 11a includes, for example, a cylindrical portion 51, the cantilever 22 of the first pressure variation sensor (P1) 11a arranged on an opening end 51a of the cylindrical portion 51 at one end in the direction of extension thereof and the cantilever 22 of the second pressure variation sensor (P2) 11b arranged on an opening end 51b of the cylindrical portion 51 at the other side in the direction of extension thereof.

The cavity 21 of the second pressure variation sensor (P2) 11b includes, for example, a bottomed cylindrical portion 52, and the cantilever 22 of the second pressure variation sensor (P2) 11b arranged at an opening end 52a of the bottomed cylindrical portion 52.

The cantilever 22 of the first pressure variation sensor (P1) 11a is subject to a flexural deformation in accordance with the pressure difference between the exterior of the pressure sensor 10 (that is, the exterior of the respective cavities 21 of the first pressure variation sensor (P1) 11a and the second pressure variation sensor (P2) 11b) and the interior of the cavity 21 of the first pressure variation sensor (P1) 11a.

The cantilever 22 of the second pressure variation sensor (P2) 11b is subject to a flexural deformation in accordance with the pressure difference between the interior of the cavity 21 of the first pressure variation sensor (P1) 11a and the interior of the cavity 21 of the second pressure variation sensor (P2) 11b.

For example, the first pressure variation sensor (P1) 11a and the second pressure variation sensor (P2) 11b have the same lower limit frequency ft which provides the sensitivity equal to or higher than a predetermined value such as the same cutoff frequency fc as the effectively same frequency characteristics by setting the distances G of the gaps 23 thereof and the capacities V of the cavities 21 thereof to be the same.

The term, "effectively same frequency characteristics" means that even though the frequency characteristics of the sensitivity are the same, for example, as in the case where the first pressure variation sensor (P1) 11a communicating, so to speak, directly, with the exterior and the second pressure variation sensor (P2) 11b communicating, so to speak, indirectly, with the exterior, have the same lower limit frequency ft, there is a case where the frequency characteristics of other parameters such as the phase difference are different.

Accordingly, the sensitivity of the first pressure variation sensor (P1) 11a provided at a position where the interior of the cavity 21 communicates, so to speak, directly, with the exterior via the gap 23 changes to have a decreasing tendency in association with decrease in the frequency with respect to the pressure variations in the frequency band lower than the lower limit frequency ft, and changes to have an increasing tendency so as to saturate from the predetermined value to the upper limit value in association with increase in frequency with respect to the pressure vibrations in the frequency band higher than the lower limit frequency ft as illustrated in FIG. 6A.

In contrast, the sensitivity of the second pressure variation sensor (P2) 11b provided at a position where the interior of the cavity 21 communicates, so to speak, indirectly, with the exterior via the first pressure variation sensor (P1) 11a changes to have a decreasing tendency in association with decrease in frequency in the same manner as the first pressure variation sensor (P1) 11a with respect to the pressure variations of the frequency band lower than the lower limit frequency ft, and changes to have a decreasing tendency after having shown an adequate maximal value in association with increase in frequency with respect to the pressure variations in the frequency band higher than the lower limit frequency ft.

Accordingly, the difference between the output from the first pressure variation sensor (P1) 11a and the output from the second pressure variation sensor (P2) 11b compensates the output in the frequency band lower than the same lower limit frequency ft as illustrated in FIG. 6B, for example.

Therefore, the pressure sensor 10, so to speak, acts so as to have sensitivity having cutoff characteristics steeper than that of the first pressure variation sensor (P1) 11a.

The output circuit 34 includes, for example, a low-pass filter, and performs a predetermined filtering process on a signal output from the differential amplifying circuit 33, and outputs the signal after the process.

As described above, according to the pressure sensor 10 of the embodiment, since the two pressure variation sensors 11 (the first pressure variation sensor (P1) 11a and the second pressure variation sensor (P2) 11b) having the effectively same frequency characteristics are arranged, so to speak, in series (two levels) on the pressure transmitting route, the two pressure variation sensors 11 have the same sensitivity with respect to the vibrations in a low frequency band, while the sensitivity of the second pressure variation sensor (P2) 11b is lower than the sensitivity of the first pressure variation sensor (P1) 11a with respect to the vibrations in a high frequency band.

Therefore, by detecting the difference between the outputs between the first pressure variation sensor (P1) 11a and the second pressure variation sensor (P2) 11b, the pressure variations in the frequency band lower than a desired lower limit frequency may be compensated, and the pressure sensor 10 may be caused to act so as to have sensitivity having cutoff characteristics steeper than that of the first pressure variation sensor (P1) 11a.

Accordingly, increase in noise (sound) with respect to the pressure variations in the desired frequency band due to the pressure variations in other frequency bands other than the desired frequency band is prevented, and saturation of the signal in the amplifying circuit of the first step is prevented.

In addition, the detection error due to the temperature characteristic or vibrations due to the disturbance generated in the first pressure variation sensor (P1) 11a and the second pressure variation sensor (P2) 11b may be compensated by the difference in output from the two pressure variation sensors 11, so that the detection accuracy of the pressure variations may be improved.

In the embodiment described above, for example, as a first modification illustrated in FIG. 7, the cavity 21 of the first pressure variation sensor (P1) 11a may include, for example, a first bottomed cylindrical portion 63 having two first opening portion 61 and second opening portion 62, the cantilever 22 of the first pressure variation sensor (P1) 11a arranged at an opening end 61a of the first opening portion 61, and the cantilever 22 of the second pressure variation sensor (P2) 11b arranged at an opening end 62a of the second opening portion 62.

In the first modification, the cavity 21 of the second pressure variation sensor (P2) 11b includes, for example, a second bottomed cylindrical portion 64, and the cantilever 22 of the second pressure variation sensor (P2) 11b arranged at an opening end 64a of the second bottomed cylindrical portion 64.

According to the first modification, the pressure sensor 10 may be manufactured easily.

Figure 8:
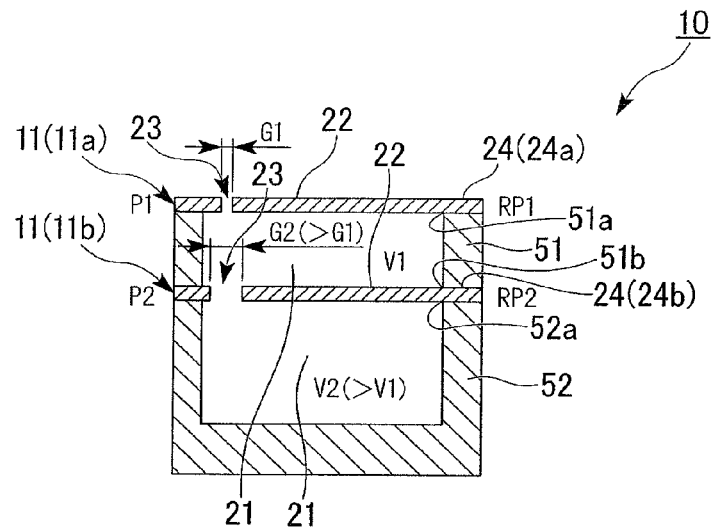
FIG. 8 is a configuration diagram of the pressure sensor according to a second modification of the invention.
Figure 9:
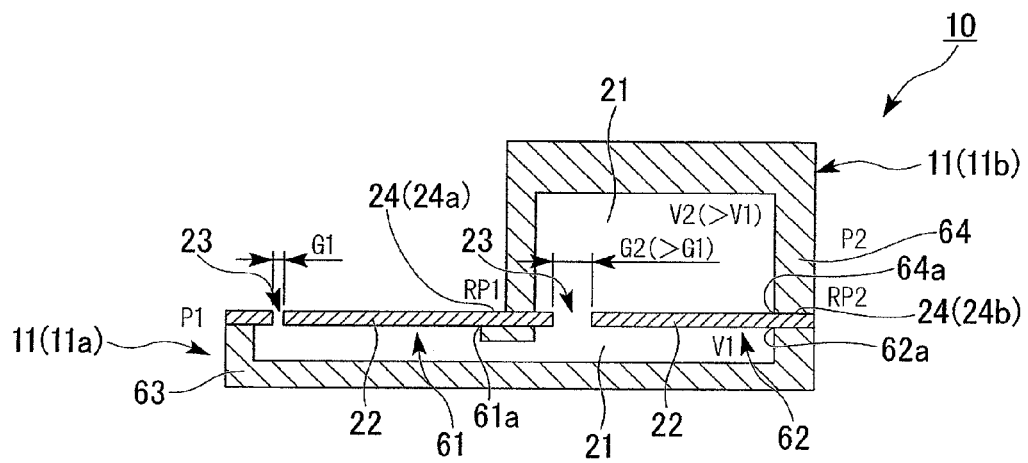
FIG. 9 is a configuration diagram of the pressure sensor according to a third modification of the invention.

In the embodiment and the first modification described above, as a second modification illustrated in FIG. 8 and a third modification illustrated in FIG. 9, for example, the first pressure variation sensor (P1) 11a and the second pressure variation sensor (P2) 11b may have the same lower limit frequency ft which provides sensitivity equal to or higher than the predetermined value such as the same cutoff frequencies fc as the effectively same frequency characteristics by setting a distance G1 of the gap 23 of the first pressure variation sensor (P1) 11a to be smaller than a distance G2 of the gap 23 of the second pressure variation sensor (P2) 11b, and setting a capacity V1 of the cavity 21 of the first pressure variation sensor (P1) 11a to be larger than a capacity V2 of the cavity 21 of the second pressure variation sensor (P2) 11b.

In the embodiment described above, the pressure sensor 10 includes the two pressure variation sensors 11 having the effectively same frequency characteristics. However, the invention is not limited thereto, and a configuration in which at least a plurality of including, for example, three or more pressure variation sensors 11 are arranged in multilevel to detect the difference cumulatively on the basis of the outputs from the pressure variation sensors 11, whereby the pressure sensor 10 is caused to act to have sensitivity having further steeper cutoff characteristics is also applicable.

In the embodiment described above, the pressure variation sensor 11 has specific frequency characteristics in accordance with the capacity V of the cavity 21 or the distance G of the gap 23. However, the invention is not limited thereto, and the pressure variation sensor 11 may have specific frequency characteristics in accordance with other parameters, for example, the shape of the cavity 21 or the shape and the position of the gap 23.

What is claimed is:

1. A pressure sensor comprising:
 a first pressure variation sensor and a second pressure variation sensor,
 the first pressure variation sensor and the second pressure variation sensor each including:
 a cavity having an opening end;
 a cantilever formed into a plate shape extending in a direction from a proximal end to a distal end and including a proximal end portion supported at the opening end of the cavity in a cantilevered manner and a distal end portion as a free end, the cantilever being configured to undergo flexural deformation in accordance with a pressure difference between the interior and the exterior of the cavity;
 a gap provided between the distal end portion of the cantilever and the opening end of the cavity and configured to communicate the interior and the exterior of the cavity;
 a deformation detecting unit configured to detect a flexural deformation of the cantilever and output a signal of a result of detection; and
 a detecting unit configured to detect the difference between outputs from the first pressure variation sensor and the second pressure variation sensor, wherein
 the first pressure variation sensor and the second pressure variation sensor have lower limit frequencies which provide sensitivities of the first pressure variation sensor and the second pressure variation sensor equal to or higher than a predetermined value as the effectively same frequency characteristics in accordance at least with the capacity of the cavity and the distance of the gap, the gap of the first pressure variation sensor communicates the exterior of the cavities of the two pressure variation sensors and the interior of the cavity of the first pressure variation sensor, and the gap of the second pressure variation sensor communicates the interior of the cavity of the first pressure variation sensor and the interior of the cavity of the second pressure variation sensor.

2. The pressure sensor according to claim 1, wherein the cantilever of the first pressure variation sensor is arranged at one opening end of a cylindrical portion forming the cavity of the first pressure variation sensor in the direction of extension thereof, and the cantilever of the second pressure variation sensor is arranged between the other opening end of the cylindrical portion on the other side in the direction of extension thereof and an opening end of a bottomed cylindrical portion forming the cavity of the second pressure variation sensor.

3. The pressure sensor according to claim 1, wherein the cantilever of the first pressure variation sensor is arranged at an opening end of a first opening portion of the first bottomed cylindrical portion forming the cavity of the first pressure variation sensor, and the cantilever of the second pressure variation sensor is arranged between an opening end of a second opening portion of the first bottomed cylindrical portion and an opening end of a second bottomed cylindrical portion forming the cavity of the second pressure variation sensor.

4. The pressure sensor according to claim 1, wherein the deformation detecting unit comprises a piezoresistance formed by doping impurity at the proximal end portion of the cantilever formed of a semiconductor material.

5. The pressure sensor according to claim 1, wherein the deformation detecting unit comprises a piezoresistance disposed only at the proximal end portion of the cantilever.

6. The pressure sensor according to claim 1, wherein the deformation detecting unit comprises two piezoresistances disposed only at the proximal end portion of the cantilever.

7. The pressure sensor according to claim 6, further comprising a wiring portion formed of a conductive material and interconnecting the piezoresistances to one another.

8. The pressure sensor according to claim 7, wherein the wiring portion and the piezoresistances are connected together in the form of a U-shape in plan view of the cantilever.

9. The pressure sensor according to claim 6, wherein the piezoresistances are disposed at the proximal end portion of the cantilever so as to interpose therebetween a through-hole penetrating the proximal end portion of the cantilever in the thickness direction of the cantilever.

10. The pressure sensor according to claim 1, wherein the first pressure variation sensor is superimposed relative to the second pressure variation sensor so that the gaps of the first and second pressure variation sensors are aligned relative one another.

11. The pressure sensor according to claim 10, wherein the distances of the gaps in the first and second pressure variation sensors are equal to one another; and wherein the value of the capacities of the cavities in the first and second pressure variation sensors are equal to one another.

12. The pressure sensor according to claim 10, wherein the distance of the gap in the first pressure variation sensor is smaller than the distance of the gap in the second pressure variation sensor; and wherein the value of the capacity of the cavity in the first pressure variation sensor is smaller than the value of the capacity of the cavity in the second pressure variation sensor.

13. The pressure sensor according to claim 1, wherein the distance of the gap in the first pressure variation sensor is equal to the distance of the gap in the second pressure variation sensor; and wherein the value of the capacity of the cavity in the first pressure variation sensor is smaller than the value of the capacity of the cavity in the second pressure variation sensor.

14. A pressure sensor comprising:
first and second pressure variation sensors having the effectively same frequency characteristics, each of the first and second pressure variation sensors comprising:
a cavity;
a cantilever having a proximal end portion supported at an opening end of the cavity in a cantilevered manner and a distal end portion having a free end, the cantilever being configured to undergo flexural deformation in accordance with a pressure difference between the interior and the exterior of the cavity;
a gap provided between the distal end portion of the cantilever and the opening end of the cavity and communicating the interior and the exterior of the cavity; and
a deformation detecting unit configured to detect
a flexural deformation of the cantilever and to output
a signal of a result of detection; and
a detecting unit configured to detect a difference between outputs from the deformation detecting units of the first and second pressure variation sensors;
wherein the first and second pressure variation sensors are connected to one another so that the gap of the first pressure variation sensor communicates the exterior of the cavities of the first and second pressure variation sensors and the interior of the cavity of the first pressure variation sensor, and so that the gap of the second pressure variation sensor communicates the interior of the cavity of the first pressure variation sensor and the interior of the cavity of the second pressure variation sensor.

15. The pressure sensor according to claim 14, wherein the cantilever of the first pressure variation sensor is arranged at one opening end of a cylindrical portion forming the cavity of the first pressure variation sensor in the direction of extension thereof, and wherein the cantilever of the second pressure variation sensor is arranged between the other opening end of the cylindrical portion on the other side in the direction of extension thereof and an opening end of a bottomed cylindrical portion forming the cavity of the second pressure variation sensor.

16. The pressure sensor according to claim 14, wherein the cantilever of the first pressure variation sensor is arranged at an opening end of a first opening portion of the first bottomed cylindrical portion forming the cavity of the first pressure variation sensor, and wherein the cantilever of the second pressure variation sensor is arranged between an opening end of a second opening portion of the first bottomed cylindrical portion and an opening end of a second bottomed cylindrical portion forming the cavity of the second pressure variation sensor.

17. The pressure sensor according to claim 14, wherein the deformation detecting unit comprises two piezoresistances disposed only at the proximal end portion of the cantilever.

18. The pressure sensor according to claim 14, wherein the first pressure variation sensor is superimposed relative to the second pressure variation sensor so that the gaps of the first and second pressure variation sensors are aligned relative one another.

19. The pressure sensor according to claim 18, wherein the distances of the gaps in the first and second pressure variation sensors are equal to one another; and wherein the value of the capacities of the cavities in the first and second pressure variation sensors are equal to one another.

20. The pressure sensor according to claim 18, wherein the distance of the gap in the first pressure variation sensor is smaller than the distance of the gap in the second pressure variation sensor; and wherein the value of the capacity of the cavity in the first pressure variation sensor is smaller than the value of the capacity of the cavity in the second pressure variation sensor.

* * * * *